(12) United States Patent
Miwa et al.

(10) Patent No.: US 11,393,220 B2
(45) Date of Patent: *Jul. 19, 2022

(54) OBSTACLE IDENTIFICATION APPARATUS AND OBSTACLE IDENTIFICATION PROGRAM

(71) Applicants: DENSO CORPORATION, Kariya (JP); TOYOTA JIDOSHA KABUSHIKI KAISHA, Toyota (JP)

(72) Inventors: Takuya Miwa, Kariya (JP); Takayuki Hiromitsu, Kariya (JP); Yutaka Hamamoto, Toyota (JP); Masumi Fukuman, Toyota (JP); Akihiro Kida, Toyota (JP); Kunihiro Sugihara, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,251

(22) Filed: Oct. 12, 2020

(65) Prior Publication Data

US 2021/0110176 A1    Apr. 15, 2021

(30) Foreign Application Priority Data

Oct. 14, 2019  (JP) .............................. JP2019-188272

(51) Int. Cl.
*G06V 20/58*    (2022.01)
*G06T 7/269*    (2017.01)
(Continued)

(52) U.S. Cl.
CPC .............. *G06V 20/58* (2022.01); *G06T 7/269* (2017.01); *G06V 10/44* (2022.01); *G06V 10/60* (2022.01); *G06T 2207/30261* (2013.01)

(58) Field of Classification Search
CPC ............ G06K 9/00805; G06K 9/4604; G06K 9/4661; G06K 9/00335; G06T 7/269;
(Continued)

(56) References Cited

U.S. PATENT DOCUMENTS 9,460,354 B2 * 10/2016 Fernandez ......... G06K 9/00791
2008/0158014 A1 * 7/2008 Zou ........................ G08G 1/166
340/988

(Continued)

FOREIGN PATENT DOCUMENTS

JP    2007-272292 A    10/2007
JP    2009-083632 A     4/2009
(Continued)

OTHER PUBLICATIONS

Translated version of JP2007272292 (Year: 2007).*
(Continued)

*Primary Examiner* — Carol Wang
(74) *Attorney, Agent, or Firm* — Maschoff Brennan

(57) ABSTRACT

An obstacle identification apparatus acquires an image that is captured by a camera that is mounted to a vehicle. The obstacle identification apparatus calculates a first gradient that is a gradient in a first direction of a luminance value of pixels in the image and a second gradient that is a gradient of the luminance value in a second direction orthogonal to the first direction of the first gradient. Based on the first gradient and the second gradient, the obstacle identification apparatus estimates a shadow boundary that is a boundary between an own-vehicle shadow that is a shadow of the own vehicle and an object outside the vehicle. Based on the estimated shadow boundary, the obstacle identification apparatus estimates the own-vehicle shadow.

17 Claims, 10 Drawing Sheets

(51) Int. Cl.
 *G06V 10/44* (2022.01)
 *G06V 10/60* (2022.01)
(58) Field of Classification Search
 CPC .......... G06T 2207/30261; G06V 20/58; G06V 10/44; G06V 10/60; G06V 40/20
 See application file for complete search history.

(56) References Cited

U.S. PATENT DOCUMENTS

| | | | |
|---|---|---|---|
| 2012/0008020 A1* | 1/2012 | Zhang | G06K 9/346 348/251 |
| 2012/0008021 A1* | 1/2012 | Zhang | G06T 7/12 348/251 |
| 2016/0292889 A1* | 10/2016 | Niwayama | G06T 7/75 |
| 2019/0325585 A1* | 10/2019 | Kakita | G06T 7/80 |

FOREIGN PATENT DOCUMENTS

| | | |
|---|---|---|
| JP | 2009-146153 A | 7/2009 |
| JP | 2011-065442 A | 3/2011 |

OTHER PUBLICATIONS

Lim, King Hann, L. M. Ang, Kah Phooi Seng, and Siew Wen Chin. "Lane-vehicle detection and tracking." In Proceedings of the international multiconference of engineers and computer scientists, vol. 2, pp. 18-20. 2009. (Year: 2009).*

U.S. Appl. No. 17/068,244 and its entire file history, filed Oct. 12, 2020, Hiromitsu et al.

\* cited by examiner

FIG.3

| −1 | 0 | 1 |
|---|---|---|
| −2 | 0 | 2 |
| −1 | 0 | 1 |

FIG.4

| −1 | −2 | −1 |
|---|---|---|
| 0 | 0 | 0 |
| 1 | 2 | 1 |

OBSTACLE IDENTIFICATION APPARATUS AND OBSTACLE IDENTIFICATION PROGRAM

CROSS-REFERENCE TO RELATED APPLICATIONS

This application is based on and claims the benefit of priority from Japanese Patent Application No. 2019-188272, filed Oct. 14, 2019. The entire disclosure of the above application is incorporated herein by reference.

BACKGROUND

Technical Field

The present disclosure relates to an obstacle identification apparatus and an obstacle identification program.

Related Art

An apparatus that estimates an own-vehicle shadow based on position information of an own vehicle, position information of the sun, advancing-direction information of the own vehicle, and three-dimensional-shape information of the own vehicle is known.

SUMMARY

One aspect of the present disclosure provides an obstacle identification apparatus that acquires an image that is captured by a camera that is mounted to a vehicle. The obstacle identification apparatus calculates a first gradient that is a gradient in a first direction of a luminance value of pixels in the image and a second gradient that is a gradient of the luminance value in a second direction orthogonal to the first direction of the first gradient. Based on the first gradient and the second gradient, the obstacle identification apparatus estimates a shadow boundary that is a boundary between an own-vehicle shadow that is a shadow of the own vehicle and an object outside the vehicle. Based on the estimated shadow boundary, the obstacle identification apparatus estimates the own-vehicle shadow.

BRIEF DESCRIPTION OF THE DRAWINGS

In the accompanying drawings:

FIG. 3 is a diagram of a Sobel filter for calculating a gradient in a U-direction;

FIG. 4 is a diagram of a Sobel filter for calculating a gradient in a V-direction;

DESCRIPTION OF THE EMBODIMENTS

Figure 1:
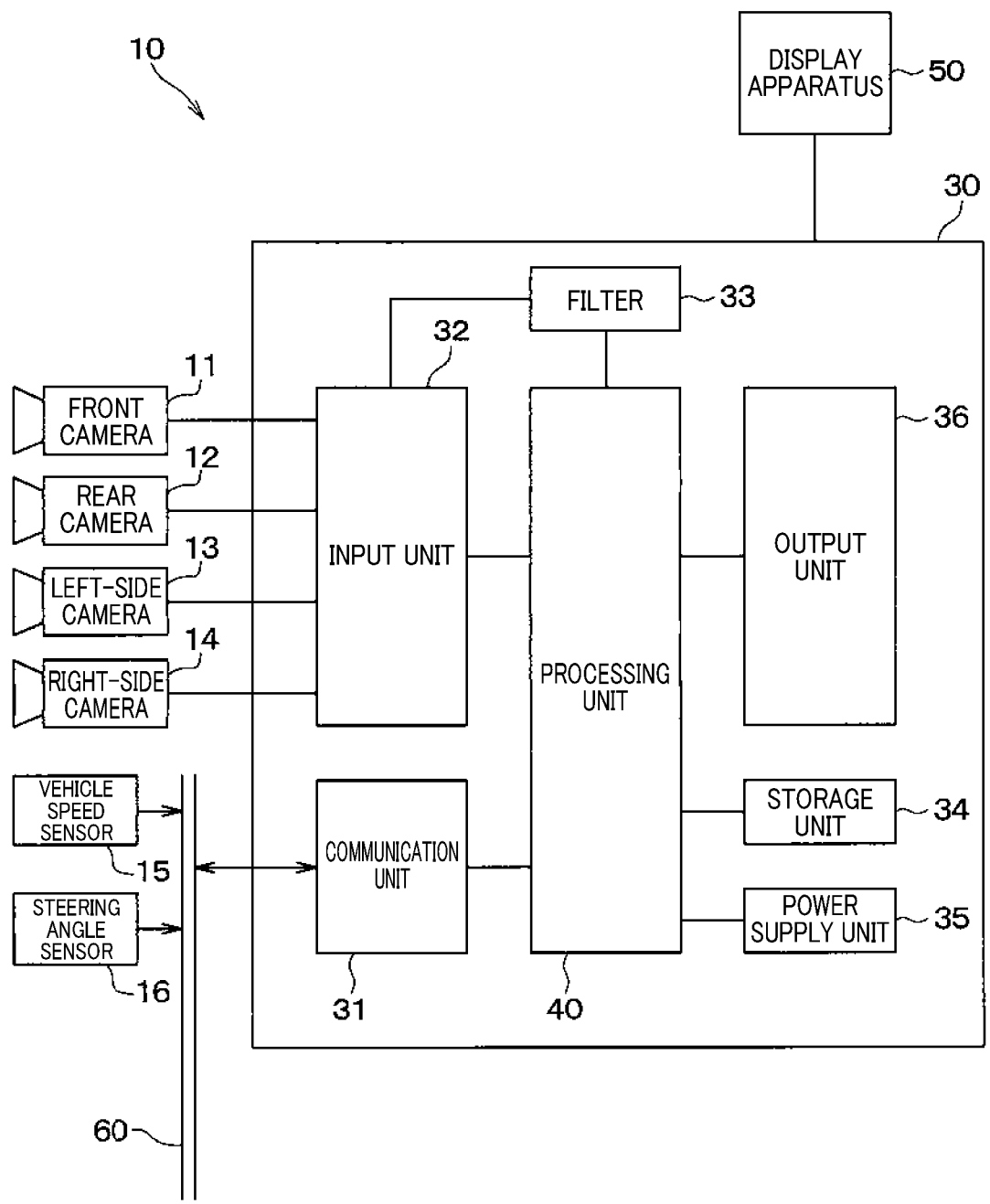
FIG. 1 is a configuration diagram of a system in which an obstacle identification apparatus according to an embodiment is used.

Conventionally, as described in JP-A-2011-065442, an apparatus that estimates an own-vehicle shadow based on position information of an own vehicle, position information of the sun, advancing-direction information of the own vehicle, and three-dimensional-shape information of the own vehicle is known. The own-vehicle shadow is a shadow of the own vehicle.

Based on a review by the inventors and the like, the apparatus described in JP-A-2011-065442 cannot easily perform the estimation because the position information of the own vehicle, the position information of the sun, the advancing-direction information of the own vehicle, and the three-dimensional-shape information of the own vehicle are required. In addition, because the shadow is limited to that formed by the sun, estimation of an own-vehicle shadow that is formed by the own vehicle being illuminated by a streetlight at night, for example, is relatively difficult.

It is thus desired to provide an obstacle identification apparatus that is capable of easily estimating an own-vehicle shadow and an obstacle identification program.

A first exemplary embodiment of the present disclosure provides an obstacle identification apparatus that includes: an acquiring unit that acquires an image that is captured by a camera that is mounted to a vehicle; a filter that calculates a first gradient that is a gradient in a first direction of a luminance value of pixels in the image and a second gradient that is a gradient of the luminance value in a second direction orthogonal to the first direction of the first gradient; a boundary estimating unit that estimates a shadow boundary based on the first gradient and the second gradient, the shadow boundary being a boundary between an own-vehicle shadow that is a shadow of the own vehicle and an object outside the vehicle; and an own-vehicle-shadow estimating unit that estimates the own-vehicle shadow based on the shadow boundary estimated by the boundary estimating unit.

A second exemplary embodiment of the present disclosure provides a non-transitory computer-readable storage medium on which an obstacle identification program is stored, the obstacle identification program including a set of computer-readable instructions that, when read and executed by a processor provided in an obstacle identification apparatus, cause the processor to implement: acquiring an image that is captured by a camera that is mounted to a vehicle; calculating a first gradient that is a gradient in a first direction of a luminance value of pixels in the image and a second gradient that is a gradient of the luminance value in a second direction orthogonal to the first direction of the first gradient; estimating a shadow boundary based on the first gradient and the second gradient, the shadow boundary being a boundary between an own-vehicle shadow that is a shadow of the own vehicle and an object outside the vehicle; and estimating the own-vehicle shadow based on the estimated shadow boundary.

A third exemplary embodiment of the present disclosure provides an obstacle identification method including: acquiring, by an obstacle identification apparatus that is mounted to a vehicle, an image that is captured by a camera that is mounted to the vehicle; calculating, by the obstacle identification apparatus, a first gradient that is a gradient in a first direction of a luminance value of pixels in the image and a second gradient that is a gradient of the luminance value in a second direction orthogonal to the first direction of the first gradient; estimating, by the obstacle identification apparatus, a shadow boundary based on the first gradient and the second gradient, the shadow boundary being a boundary between an own-vehicle shadow that is a shadow of the own vehicle and an object outside the vehicle; and estimating, by the obstacle identification apparatus, the own-vehicle shadow based on the estimated shadow boundary.

As a result, because the own-vehicle shadow is estimated based on luminance information and gradient information, estimation of the own-vehicle shadow is facilitated.

Embodiments will hereinafter be described with reference to the drawings. Here, sections among the embodiments below that are identical or equivalent to each other are given the same reference numbers. Descriptions thereof are omitted.

An obstacle identification apparatus 30 according to a present embodiment is used in an obstacle identification system 10 that is mounted to a vehicle 90. The obstacle identification system 10 identifies whether an object in a periphery of the vehicle 90 is any of an own-vehicle shadow Sc, a stationary object, and a moving object. The own-vehicle shadow Sc is a shadow of the vehicle 90. First, the obstacle identification system 10 will be described.

As shown in FIG. 1, the obstacle identification system 10 includes a front camera 11, a rear camera 12, a left-side camera 13, a right-side camera 14, a vehicle speed sensor 15, a steering angle sensor 16, an obstacle identification apparatus 30, and a display apparatus 50. In addition, here, for example, the vehicle speed sensor 15, the steering sensor 16, and the obstacle identification apparatus 30 are connected to an onboard local area network (LAN) 60. For example, a controller area network (CAN) is used as the onboard LAN 60.

Each of the front camera 11, the rear camera 12, the left-side camera 13, and the right-side camera 14 is a single-lens digital camera. In addition, each of the front camera 11, the rear camera 12, the left-side camera 13, and the right-side camera 14 has a fish-eye lens. An angle of view of each of the front camera 11, the rear camera 12, the left-side camera 13, and the right-side camera 14 is 180 degrees. Furthermore, for example, the front camera 11 is attached to an inner side of a radiator grille (not shown) of the vehicle 90.

Figure 2:
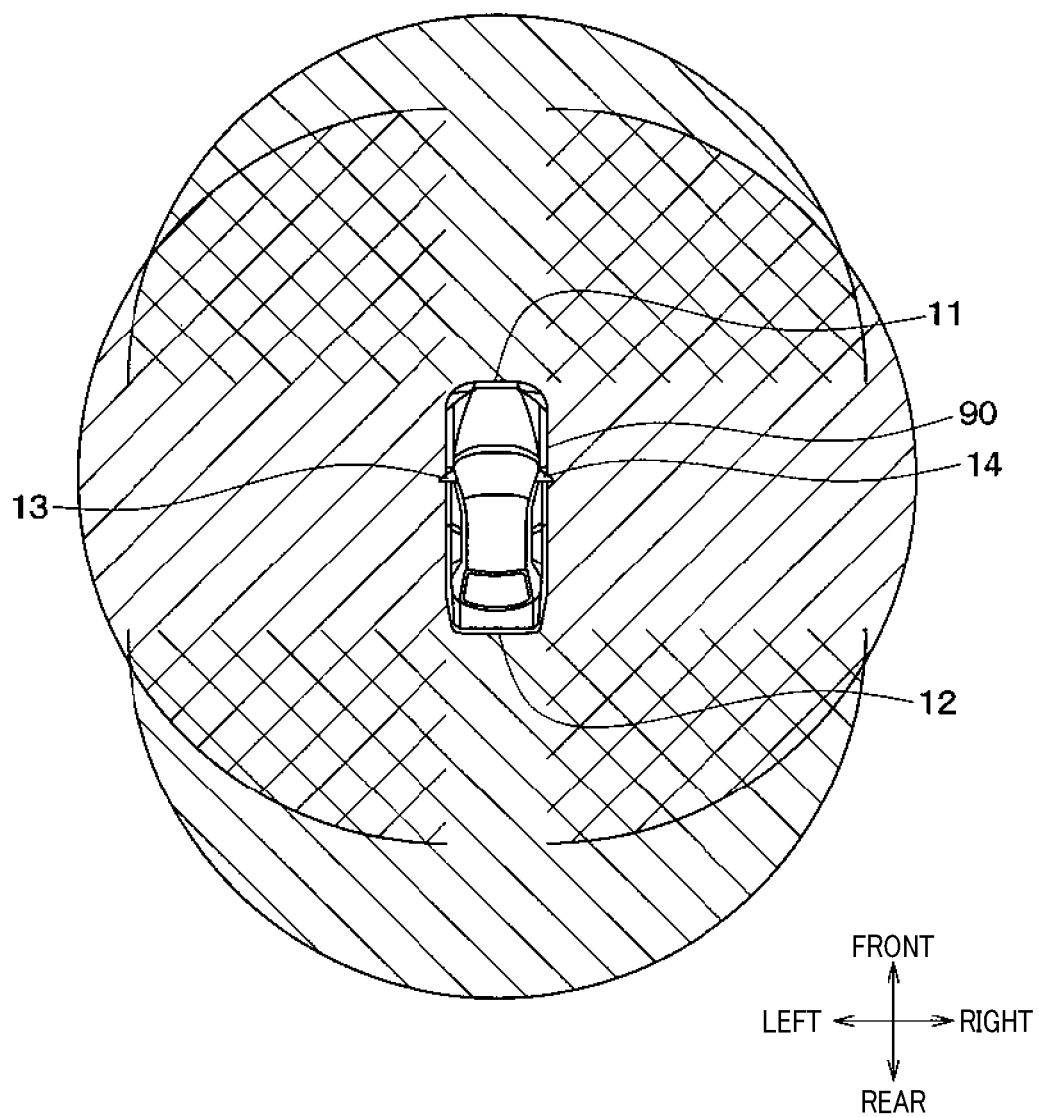
FIG. 2 is a top view of a vehicle showing imaging ranges of cameras.

As shown in FIG. 2, the front camera 11 captures an image of an area ahead of the vehicle 90. For example, the rear camera 12 is attached to a lower side of a rear end of the vehicle 90. The rear camera 12 captures an image of an area behind the vehicle 90. For example, the left-side camera 13 is attached to a lower side of a left sideview mirror of the vehicle 90. The left-side camera 13 captures an image of an area on a left side in relation to a frontward direction of the vehicle 90. For example, the right-side camera 14 is attached to a lower side of a right sideview mirror of the vehicle 90. The right-side camera 14 captures an image of an area on a right side in relation to the frontward direction of the vehicle 90.

The images respectively captured by the front camera 11, the rear camera 12, the left-side camera 13, and the right-side camera 14 are outputted to the obstacle identification apparatus 30. Here, in FIG. 2, respective imaging ranges of the front camera 11, the rear camera 12, the left-side camera 13, and the right-side camera 14 are schematically indicated by diagonal hatching. In addition, portions in which the imaging ranges of the front camera 11, the rear camera 12, the left-side camera 13, and the right-side camera 14 overlap are schematically indicated by crosshatching.

The vehicle speed sensor 15 outputs a signal based on an own vehicle speed Vc to the onboard LAN 60. The own vehicle speed Vc is a speed of the vehicle 90.

The steering angle sensor 16 outputs a signal based on a steering angle θs to the onboard LAN 60. The steering angle θs is based on a steering operation of the vehicle 90.

The obstacle identification apparatus 30 is mainly configured by a microcomputer or the like. The obstacle identification apparatus 30 includes a central processing unit (CPU), a read-only memory (ROM), a random access memory (RAM), a flash memory, an input/output (I/O), a bus line that connects these components, and the like. Specifically, the obstacle identification apparatus 30 includes a communication unit 31, an input unit 32, a filter 33, a storage unit 34, a power supply unit 35, an output unit 36, and a processing unit 40.

The communication unit 31 communicates with the onboard LAN 60, thereby respectively acquiring the own vehicle speed Vc and the steering angle θs from the vehicle speed sensor 15 and the steering angle sensor 16.

The input unit 32 acquires the images captured by the front camera 11, the rear camera 12, the left-side camera 13, and the right-side camera 14. In addition, the input unit 32 outputs the acquired images to the filter 33 and the processing unit 40.

The filter 33 is a dedicated accelerator that specializes in performing a filtering process. The filter 33 calculates a luminance value of an output image based on a luminance value of a pixel and a luminance value of the periphery of the pixel in each image received from the input unit 32.

Here, on each of the images received from the input unit 32, the filter 33 performs image reduction in which a resolution σi is changed, such as image reduction for a Gaussian pyramid. In addition, the filter 33 performs calculation using a Gaussian filter for noise removal.

Figures 3, 4:
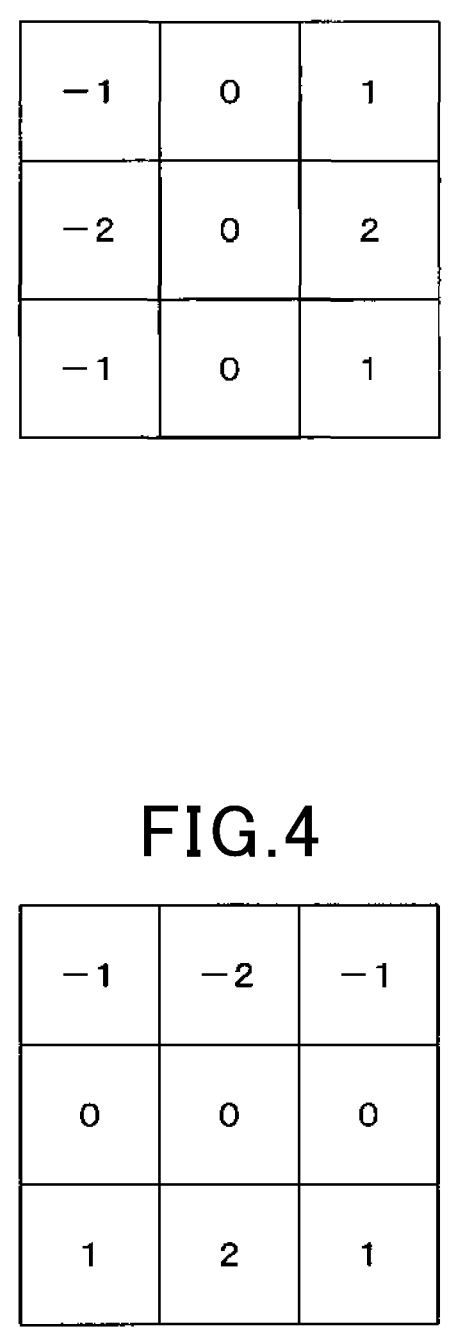

Furthermore, as shown in FIG. 3 and FIG. 4, the filter 33 performs calculation using a Sobel filter for edge detection. Therefore, the filter 33 outputs, to the processing unit 40, values of the images received from the input unit 32 and the reduced images, the values being obtained by calculation using the Gaussian filter and the Sobel filter being performed on the images.

Figure 5:
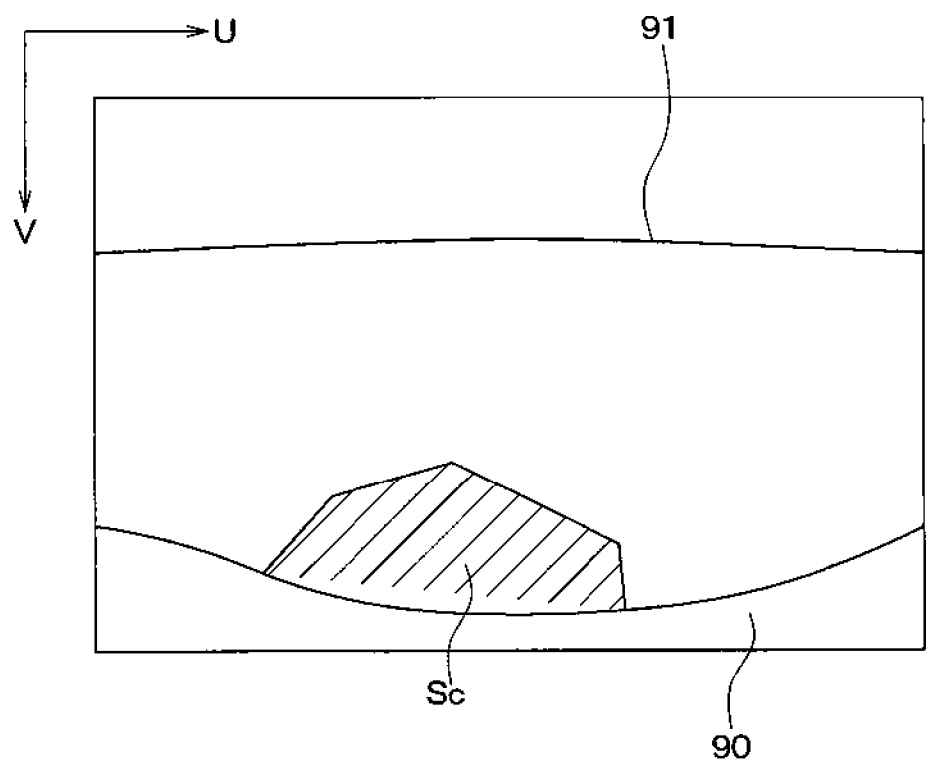
FIG. 5 is an example of an image captured by a camera.

Here, FIG. 3 is an example of a Sobel filter for determining a gradient in a U-direction in each of the images captured by the front camera 11, the rear camera 12, the left-side camera 13, and the right-side camera 14, shown in FIG. 5. Furthermore, FIG. 4 is an example of a Sobel filter for determining a gradient in a V-direction in each of the images captured by the front camera 11, the rear camera 12, the left-side camera 13, and the right-side camera 14, shown in FIG. 5.

Here, the U-direction is a left/right direction in relation to the image. In addition, a direction from the left side to the right side of the image is a positive direction of the U-direction. Furthermore, the V-direction is an up/down direction in relation to the image. In addition, a direction from an upper side to a lower side of the image is a positive direction of the V-direction.

In FIG. 5, the own-vehicle shadow Sc, a portion of the vehicle 90, and a horizon 91 are shown as an example of an image that is captured by any of the front camera 11, the rear camera 12, the left-side camera 13, and the right-side camera 14. In addition, the own-vehicle shadow Sc is indicated by diagonal hatching for clarity.

The storage unit 34 includes the RAM, the ROM, the flash memory, and the like. The storage unit 34 stores therein a program that is run by the processing unit 40, described hereafter, and types of objects that are identified by the processing unit 40.

The power supply unit 35 supplies the processing unit 40, described hereafter, with electric power to enable the processing unit 40 to run a program, when ignition of the vehicle 90 is turned on.

The output unit 36 outputs image data that is processed by the processing unit 40, described hereafter, to the display apparatus 50.

The processing unit 40 corresponds to an acquiring unit, an estimating unit, a correcting unit, an extracting unit, a generating unit, a selecting unit, a determining unit, and an extrapolating unit. The processing unit 40 runs a program that is stored in the storage unit 34. In addition, when running the program, the processing unit 40 uses the RAM of the storage unit 34 as a work area.

The display apparatus 50 displays the image data from the output unit 36. As a result, an image that is processed by the processing unit 40 can be made visible in the obstacle identification system 10.

The obstacle identification system 10 is configured as described above. In the obstacle identification system 10, an object in the periphery of the vehicle 90 is identified by the processing unit 40 of the obstacle identification apparatus 30 running a program. Specifically, an object that appears in an image that is captured by the front camera 11, the rear camera 12, the left-side camera 13, and the right-side camera 14 is identified as being any of the own-vehicle shadow Sc, a stationary object, and a moving object.

Next, identification performed by the processing unit 40 will be described with reference to a flowchart in FIG. 6. Here, for example, the processing unit 40 performs identification of an object by running a program that is stored in the ROM, when the ignition of the vehicle 90 is turned on. In addition, here, for convenience, a period over which a series of operations from a start of a process at step S110 by the processing unit 40 to a return to the process at step S110 is performed is referred to as a processing cycle τ of the processing unit 40.

For example, an amount of time of the processing cycle τ of the processing unit 40 ranges from several tens of milliseconds to a hundred milliseconds. Furthermore, here, for convenience, the processing cycle at a current point is referred to as a current processing cycle τ(n), as appropriate. Moreover, a previous processing cycle in relation to the current point is referred to as a previous processing cycle τ(n−1), as appropriate.

Here, n is a natural number that is 1 or greater, and is a number of times that the processes from step S110 back to step S110 of the processing unit 40 are performed. In addition, each value, described hereafter, of the processing unit 40 in an initial processing cycle τ(0) at which the ignition of the vehicle 90 is turned on is set in advance.

At step S110, the processing unit 40 acquires the images respectively captured by the front camera 11, the rear camera 12, the left-side camera 13, and the right-side camera 14 from the input unit 32. In addition, the processing unit 40 acquires, from the filter 33, images processed by the filter 33 that respectively correspond to the acquired images.

Figure 7:
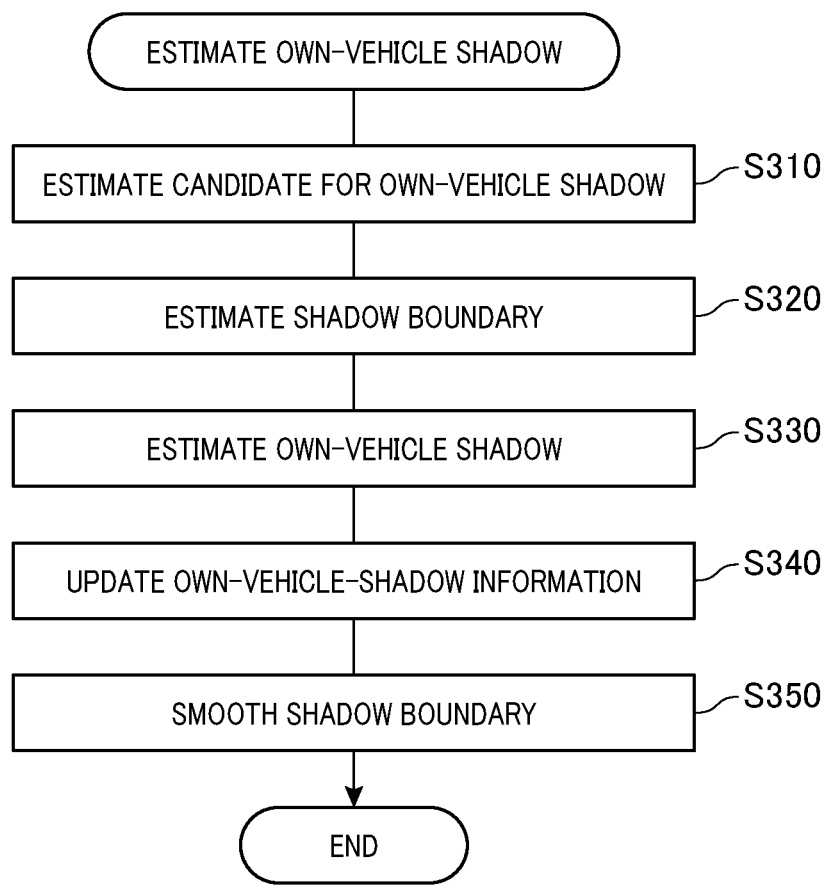
FIG. 7 is a sub-flowchart of estimation of an own-vehicle shadow performed by the processing unit.

Next, at step S115, the processing unit 40 estimates the own-vehicle shadow Sc within an image, based on the images acquired at step S110. The estimation of the own-vehicle shadow Sc will be described in detail with reference to a flowchart in FIG. 7.

At step S310, the processing unit 40 estimates a candidate for the own-vehicle shadow Sc in an image acquired from the input unit 32. Here, to describe the estimation of a candidate, the luminance value of each pixel in an image acquired from the input unit 32 is an input luminance Ic(U,V).

Here, for example, the luminance value of the pixel expresses a value in a single pixel by a numeric value that ranges from 0 to 255. In addition, the U in (U,V) indicates a pixel position in the U-direction from a reference position within the image. Furthermore, the V in (U,V) indicates a pixel position in the V-direction from the reference position within the image.

Specifically, as shown in a relational expression (1), below, the processing unit 40 estimates a pixel of which the input luminance Ic(U,V) is less than a shadow threshold Is_th to be a candidate for the own-vehicle shadow Sc.

$$Ic(U,V) < Is\_th \quad (1)$$

Here, the shadow threshold Is_th is calculated at each processing cycle τ.

Figure 8:
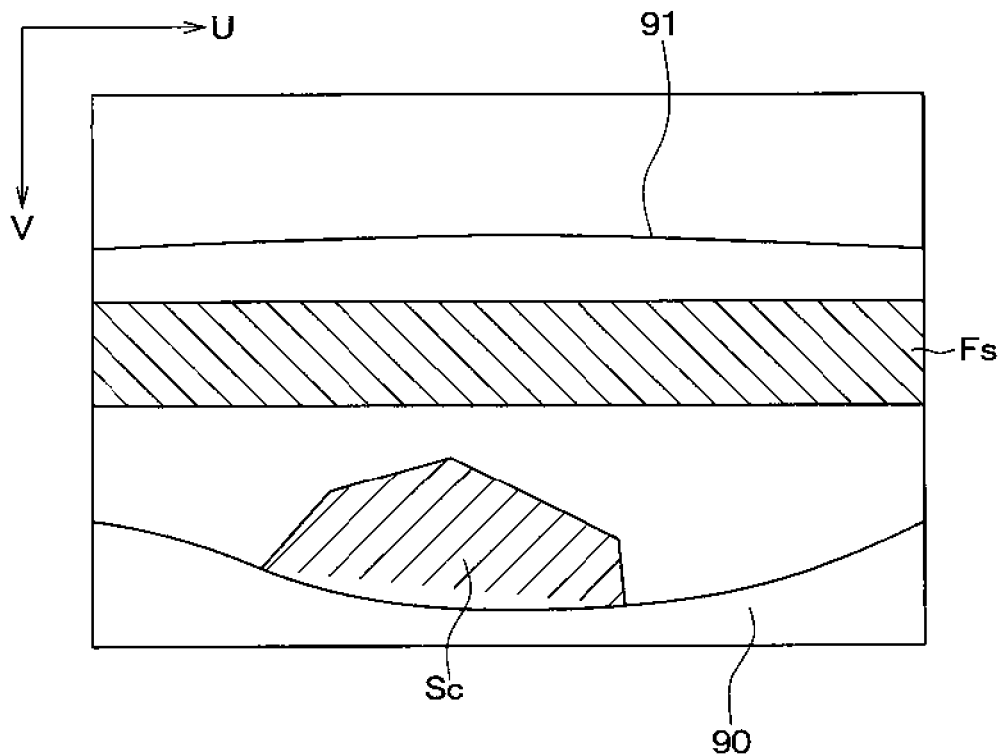
FIG. 8 is a diagram of estimation of candidates for the own-vehicle shadow.

Specifically, for example, as shown in FIG. 8, the processing unit 40 calculates variance of the luminance values in a predetermined area Fs within an area that is on an upper side of the image from the vehicle 90 and on a lower side of the image from the horizon 91, for each of the four images acquired at step S110. The processing unit 40 then extracts an image of which the calculated variance is smallest.

In addition, the processing unit 40 extracts an average of the luminance values in the predetermined area Fs in the extracted image. Then, the processing unit 40 sets the extracted average of the luminance values as the shadow threshold Is_th. As a result, the luminance value of an area in which the variance in the luminance values is relatively small is used for calculation. Therefore, accuracy of the shadow threshold Is_th is relatively high. Consequently, estimation accuracy regarding the candidate for the own-vehicle shadow Sc improves.

Here, a position of the own vehicle 90 within an image and a position of the horizon 91 within an image are respectively set in advance based on the attachment positions, angles of view, and the like of the front camera 11, the rear camera 12, the left-side camera 13, and the right-side camera 14. In addition, in FIG. 8, an example of the predetermined area Fs is indicated by diagonal hatching.

Next, at step S320, the processing unit 40 estimates a shadow boundary Bs from the candidates for the own-vehicle shadow Sc estimated at step S310. Here, the shadow boundary Bs is a boundary between the own-vehicle shadow Sc and an object that is outside the vehicle 90, such as a boundary between the own-vehicle shadow Sc and a road surface.

Specifically, as shown in a relational expression (2), below, the processing unit 40 calculates a luminance gradient Mc of each pixel.

$$Mc = \sqrt{(Iu)^2 + (Iv)^2} \quad (2)$$

The luminance gradient Mc is a positive square root of a sum of Iu squared and Iv squared. In the relational expression (2), Iu is the gradient in the U-direction of the input luminance Ic(U,V) and is calculated by the filter 33. In addition, Iu corresponds to a first gradient. Furthermore, Iv is a gradient in the V-direction of the input luminance Ic(U,V) and is calculated by the filter 33. In addition, Iv corresponds to a second gradient.

Figure 9:
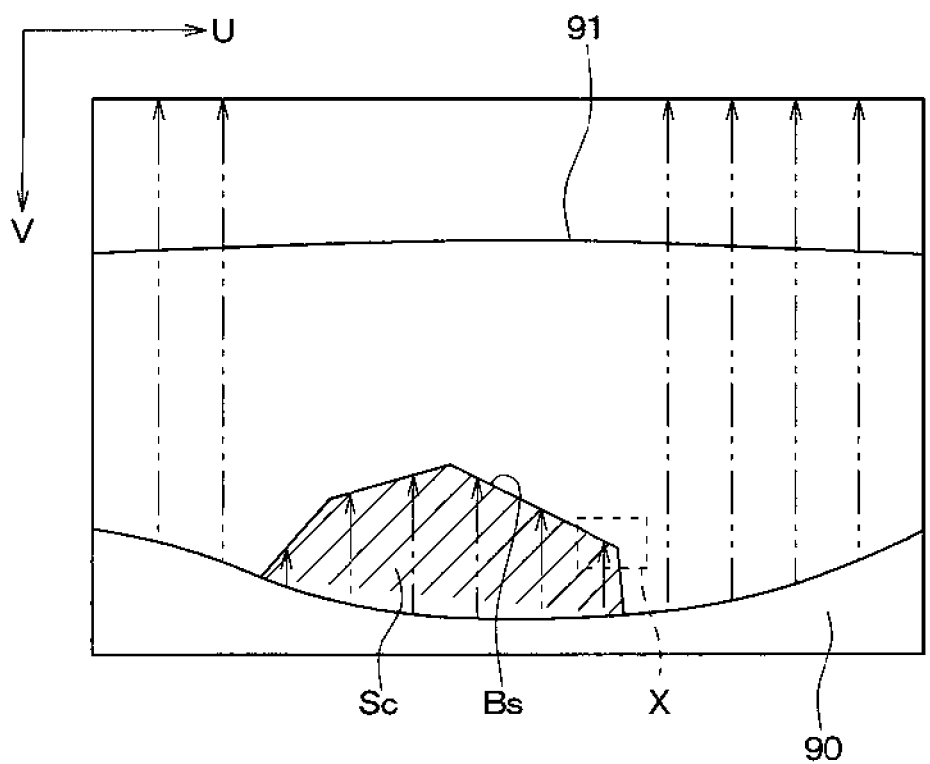
FIG. 9 is a diagram of estimation of a shadow boundary.

Next, as shown in FIG. 9, the processing unit 40 scans the image along a direction in which the own-vehicle shadow Sc extends, that is, a negative direction of the V-direction in this case. A relatively large luminance gradient Mc is formed at the shadow boundary Bs. Therefore, as a result of the scan, the processing unit 40 extracts a pixel of which the luminance gradient Mc is equal to or greater than a boundary gradient threshold Mb_th, as shown in a relational expression (3), below.

$$Mc \geq Mb\_th \tag{3}$$

Then, when the processing unit 40 continuously extracts a predetermined quantity Ns of pixels along the scanning direction, that is, the negative direction of the V-direction in this case, among the extracted pixels, the processing unit 40 estimates these pixels to be the shadow boundary Bs.

Here, the boundary gradient threshold Mb_th and the predetermined quantity Ns are values for retrieving the shadow boundary Bs and are set based on experiments, simulations, and the like. In addition, for example, the predetermined quantity Ns is a natural number of 2 or greater. Furthermore, in FIG. 9, the direction in which scanning is performed by the processing unit 40 is indicated by a two-dot chain line.

In addition, here, the processing unit 40 further performs calculation such as that below to improve estimation accuracy regarding the shadow boundary Bs.

Figure 10:
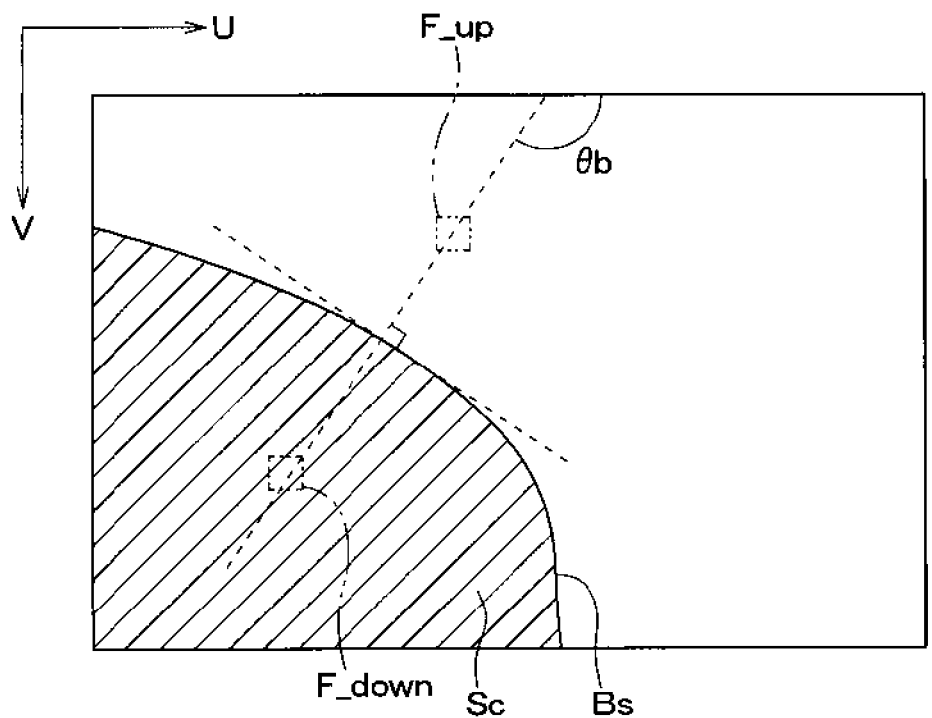
FIG. 10 is an enlarged view of a section X in FIG. 9.

Specifically, as shown in FIG. 10 and a relational expression (4), below, the processing unit 40 calculates a boundary gradient angle θb based on the gradient of the luminance value of a pixel of the shadow boundary Bs.

$$\theta b = \tan^{-1}\left(\frac{Ivb}{Iub}\right) \tag{4}$$

The boundary gradient angle θb is a gradient angle of each pixel of the shadow boundary Bs estimated as described above. Here, in the relational expression (4), Iub is a gradient in the U-direction of the luminance value of a pixel of the shadow boundary Bs and is calculated by the filter 33. In addition, Ivb is a gradient in the V-direction of the luminance value of a pixel of the shadow boundary Bs and is calculated by the filter 33.

The processing unit 40 also calculates a normal line that passes through the pixel of the shadow boundary Bs based on the calculated boundary gradient angle θb. Here, an average of the luminance values of a pixel that is on the upper side of the image from a pixel of the shadow boundary Bs that is estimated based on the above-described luminance gradient Mc and on the normal line, and pixels in the periphery thereof is an upper-side average luminance μ_up. In addition, an average of the luminance values of a pixel that is on the lower side of the image from the pixel of the shadow boundary Bs that is estimated based on the above-described luminance gradient Mc and on the normal line, and pixels in the periphery thereof is an lower-side average luminance μ_down.

Furthermore, when the shadow boundary Bs is a boundary between the own-vehicle shadow Sc and the road surface, the road surface appears in the image on the upper side of the image from the shadow boundary Bs. Moreover, the own-vehicle shadow Sc appears in the image on the lower side of the image from the shadow boundary Bs. Therefore, the upper-side average luminance μ_up is greater than the lower-side average luminance μ_down.

Therefore, as shown in a relational expression (5), below, when the upper-side average luminance μ_up is greater than the lower-side average luminance μ_down, the processing unit 40 sets the pixel of the shadow boundary Bs as the shadow boundary Bs.

$$\mu\_up > \mu\_down \tag{5}$$

As a result, the shadow boundary Bs of which accuracy is relatively high is estimated. Here, in FIG. 10, an example of the normal line and a tangential line that is orthogonal to the normal line are shown by broken lines. In addition, an example of an area in which the upper-side average luminance μ_up is calculated is indicated by F_up. Furthermore, an example of an area in which the lower-side average luminance μ_down is calculated is indicated by F_down.

Next, at step S330, among the candidates for the own-vehicle shadow Sc estimated at step S310, the processing unit 40 estimates an area that is surrounded by the shadow boundary Bs estimated at step S320 and the vehicle 90 appearing in the image to be the own-vehicle shadow Sc.

Next, at step S340, the processing unit 40 stores first own-vehicle-shadow information Xs1, described hereafter, in the flash memory of the storage unit 34 based on the estimated own-vehicle shadow Sc and shadow boundary Bs. In addition, as described hereafter, the processing unit 40 stores, as necessary, second own-vehicle-shadow information Xs2 in the flash memory of the storage unit 34 based on the estimated own-vehicle shadow Sc and shadow boundary Bs.

Specifically, the processing unit 40 stores pixel positions of the own-vehicle shadow Sc and the shadow boundary Bs estimated in the current processing cycle τ(n) as the first own-vehicle-shadow information Xs1 in the flash memory of the storage unit 34. In addition, the first own-vehicle-shadow information Xs1 is updated at each processing cycle τ of the processing unit 40.

Furthermore, the processing unit 40 stores pixel positions of the own-vehicle shadow Sc and the shadow boundary Bs that are stable as the second own-vehicle-shadow information Xs2 in the flash memory of the storage unit 34. Here, stability of the own-vehicle shadow Sc and the boundary shadow Bs is determined by the processing unit 40 based on a boundary movement amount ΔB. The boundary movement amount ΔB is an amount of movement of the pixel position of the shadow boundary Bs in the current processing cycle τ(n) in relation to the pixel position of each shadow boundary Bs estimated before the current processing cycle τ(n).

Specifically, the processing unit 40 calculates the boundary movement amount ΔB based on a change in the shadow boundary Bs estimated in the current processing cycle τ(n) in relation to the pixel positions of each shadow boundary Bs estimated before the current processing cycle τ(n). For example, the processing unit 40 calculates the boundary movement amount ΔB based on the changes in the shadow boundary Bs in a normal direction, the U-direction, and the V-direction. Then, when the calculated boundary movement amount ΔB is equal to or less than a stability threshold ΔB_th, the processing unit 40 determines that the own-vehicle shadow Sc and the shadow boundary Bs in the current processing cycle τ(n) are stable because the change in the shadow boundary Bs is relatively small.

Therefore, the processing unit 40 stores the pixel positions of the own-vehicle shadow Sc and the shadow boundary Bs in the current processing cycle τ(n) in the flash memory of the storage unit 34 as the second own-vehicleshadow information Xs2. Here, when the own-vehicle shadow Sc and the shadow boundary Bs in the current processing cycle τ(n) are stable, the second own-vehicle-shadow information Xs2 is identical to the first own-vehicle-shadow information Xs1.

In addition, when the calculated boundary movement amount ΔB is greater than the stability threshold ΔB_th, the processing unit 40 determines that the own-vehicle shadow Sc and the shadow boundary Bs in the current processing cycle τ(n) are not stable because the change in the shadow boundary Bs is relatively large. Therefore, the processing unit 40 keeps the second own-vehicle-shadow information Xs2 set to the pixel positions of the own-vehicle shadow Sc and the shadow boundary Bs determined to be stable in a processing cycle τ before the current processing cycle τ(n).

For example, the own-vehicle shadow Sc and the shadow boundary Bs in the current processing cycle τ(n) are not stable, and the own-vehicle shadow Sc and the shadow boundary Bs in the previous processing cycle τ(n−1) are stable. In the current processing cycle τ(n), the pixel positions of the own-vehicle shadow Sc and the shadow boundary Bs in the previous processing cycle τ(n−1) remain stored in the flash memory of the storage unit 34 as the second own-vehicle-shadow information Xs2.

Next, at step S350, the processing unit 40 smooths the shadow boundary Bs and the own-vehicle shadow Sc updated at step S340.

Specifically, based on a first pixel position of the shadow boundary Bs estimated at step S320 and a second pixel position of the shadow boundary Bs that is arrayed in the U-direction from the first pixel position, the processing unit 40 estimates a third pixel position of the shadow boundary Bs that should originally be present adjacent in the U-direction to the first pixel position of the shadow boundary Bs. Then, the processing unit 40 calculates a distance from the third estimated pixel position of the shadow boundary Bs that should originally be present to an actual second pixel position of the shadow boundary Bs.

Figure 11:
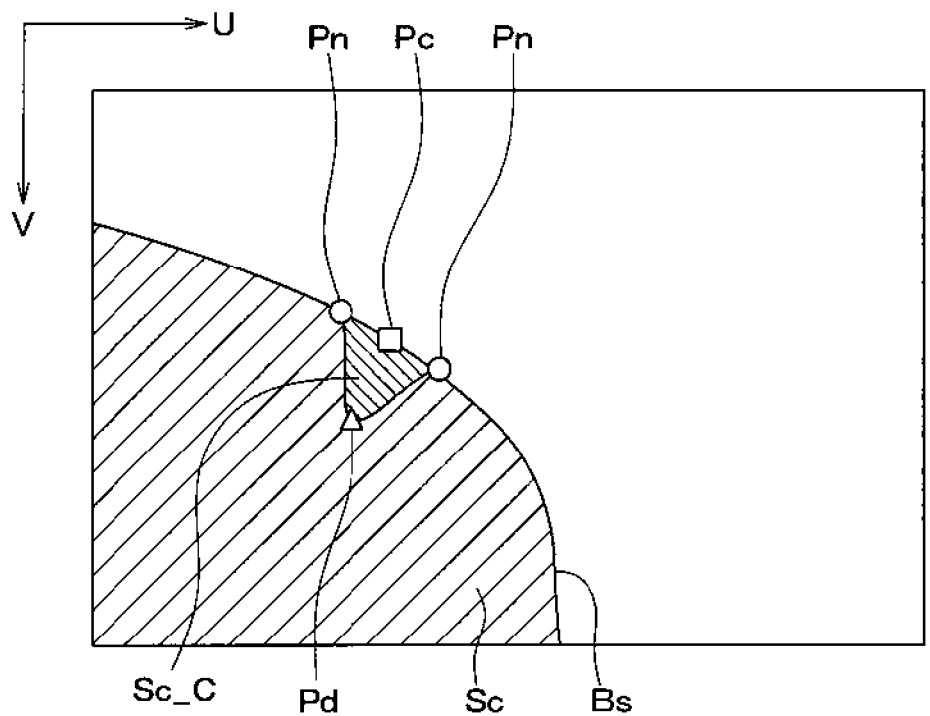
FIG. 11 is a diagram of smoothing of the own-vehicle shadow and the shadow boundary.

When the distance is equal to or greater than a threshold, a deficiency has occurred in the shadow boundary Bs and the own-vehicle shadow Sc. Therefore, as shown in FIG. 11, the processing unit 40 corrects the second pixel position of the shadow boundary Bs that is adjacent in the U-direction to the first pixel position so that the second pixel position matches the estimated third pixel position. In addition, the processing unit 40 supplements a deficient portion of the own-vehicle shadow Sc by correcting the own-vehicle shadow Sc based on the corrected second pixel position. As a result, the shadow boundary Bs and the own-vehicle shadow Sc are smoothed.

Here, when the distance between the estimated third pixel position of the shadow boundary Bs that is adjacent in the U-direction and the actual second pixel position of the shadow boundary Bs that is adjacent in the U-direction is less than the threshold, the processing unit 40 does not correct the second pixel position of the shadow boundary Bs that is adjacent to the first pixel position to the estimated third pixel position, and maintains the actual second pixel position.

In addition, in FIG. 11, the pixel of the shadow boundary Bs in a portion that is not deficient is schematically indicated by Pn and a white circle. Furthermore, the pixel of the shadow boundary Bs in the deficient portion is schematically indicated by Pd and a white triangle. The pixel of the shadow boundary Bs that is corrected is schematically indicated by Pc and a white square. In addition, the supplemented own-vehicle shadow Sc is indicated by Sc_C and diagonal hatching.

The processing unit 40 performs estimation of the own-vehicle shadow Sc in the manner described above. Subsequently, the process proceeds to step S120.

Figure 6:
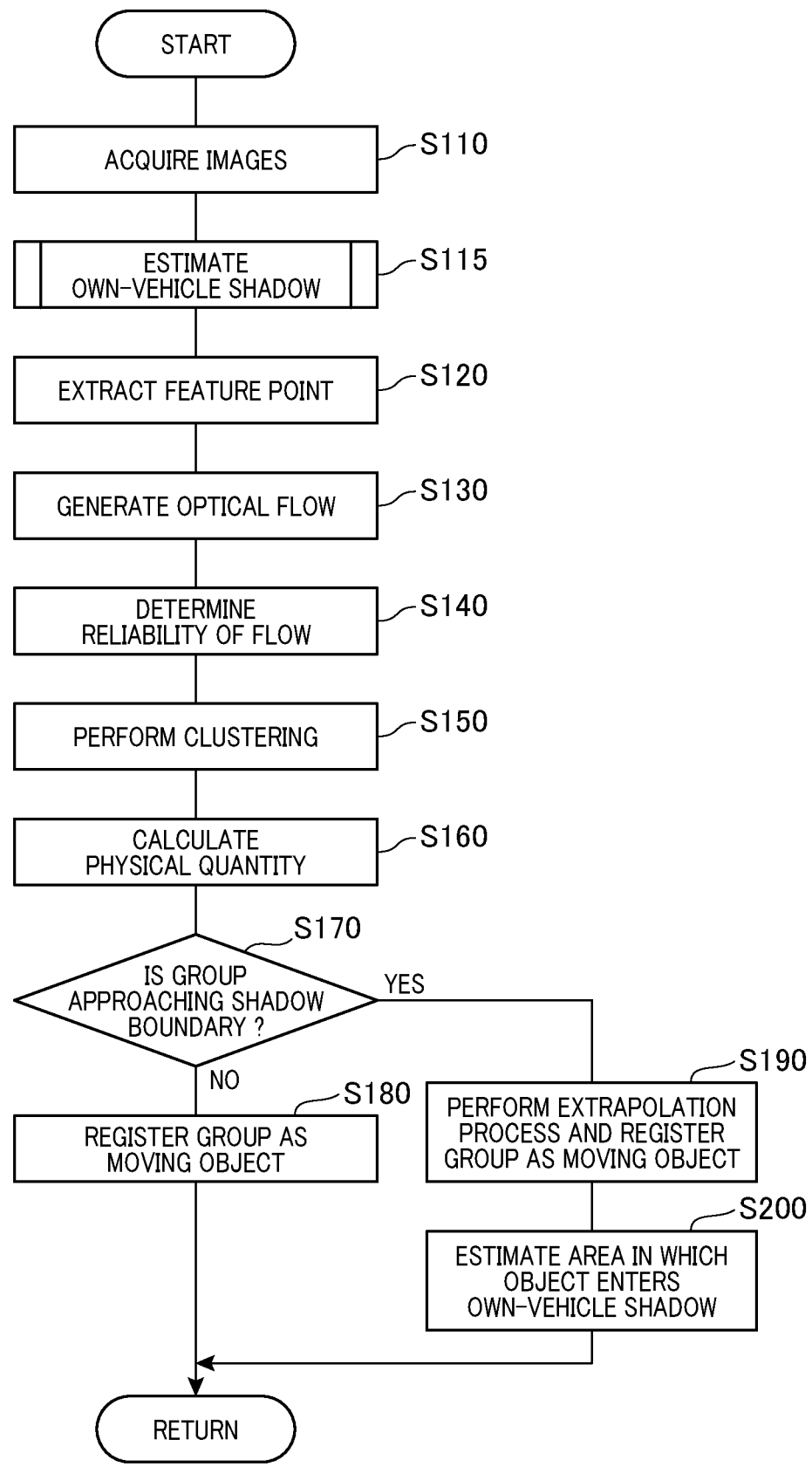
FIG. 6 is a flowchart of a process performed by a processing unit.

As shown in FIG. 6, at step S120 following step S115, the processing unit 40 extracts a feature point of the object in each of the images acquired at step S110. For example, as shown in a relational expression (6), below, the processing unit 40 extracts a pixel of which the luminance gradient Mc is equal to or greater than a feature point threshold Mp_th as a feature point. Here, the feature point threshold Mp_th is a value for extracting a feature point of an obstacle in an image and is set by experiments, simulations, and the like.

$$Mc \geq Mp\_th \tag{6}$$

Next, at step S130, the processing unit 40 generates an optical flow OP based on the feature point extracted at step S120. For example, the processing unit 40 generates the optical flow OP using a block matching method. Here, the optical flow OP is a movement vector of the feature point extracted in the current processing cycle τ(n) that correspond to the feature point extracted in the previous processing cycle τ(n−1), in the image.

Specifically, the processing unit 40 scans a pixel block that centers around a pixel of a feature point extracted in the previous processing cycle τ(n−1) in an image acquired in the current processing cycle τ(n), as a template. The processing unit 40 calculates a difference between a luminance value in a pixel position in the template and a luminance value in a pixel position in the image acquired in the current processing cycle τ(n) position corresponding to the pixel position in the template, for each pixel position. Then, the processing unit 40 calculates a sum of absolute difference (SAD) of the luminance values in the pixel block. As a result, the processing unit 40 estimates a degree of similarity between the feature point in the previous processing cycle τ(n−1) and the feature point in the current processing cycle τ(n).

Then, the processing unit 40 connects the feature point in the previous processing cycle τ(n−1) and the feature point in the current processing cycle τ(n) of which the calculated SAD is smallest, that is, the degree of similarly is greatest. As a result, the processing unit 40 generates the optical flow OP of the feature point extracted in the previous processing cycle τ(n−1). In addition, here, for each image, the processing unit 40 changes the resolution σi, that is, a pyramid level of the image, and generates the optical flow OP in the image at each resolution σi in the manner described above.

Next, at step S140, the processing unit 40 determines reliability of each optical flow OP generated at step S130. Specifically, the processing unit 40 selects the optical flow OP of which reliability regarding the object appearing in the image being a moving object is relatively high.

Here, to describe the selection of the optical flow OP, the following terms are defined. A number of times that the optical flows OP that correspond to each other between processing cycles τ are continuously generated, that is, a number of times that the optical flow OP is continuously tracked is referred to as a tracking count Nt. The tracking count Nt is increased by the processing unit 40 each time the optical flows OP that correspond to each other between processing cycles τ are generated.

In addition, a coordinate component in the U-direction of the optical flow OP is referred to as a flow U-component ΔU. A coordinate component in the V-direction of the optical flow OP is referred to as a flow V-component ΔV. A length of the optical flow OP is referred to as a flow length Lf A length that is obtained by a length of the optical flow OP corresponding to a movement distance of the vehicle 90 being subtracted from the flow length Lf is referred to as an ego-cancel flow length Lc.

An angle that is formed by the optical flow OP and an axis that extends in the U-direction is a flow angle θf. A value that is obtained by the angle of the optical flow OP generated in the previous processing cycle τ(n−1) being subtracted from the angle of the optical flow OP generated in the current processing cycle τ(n) is referred to as a flow direction difference Δθf. An indicator that indicates whether there is a corner in which two distinct edges are present in the image is referred to as a corner degree Rf.

In addition, the processing unit 40 selects the optical flow OP that is generated in an image of which the resolution σi is equal to or greater than a resolution threshold σi_th, as shown in a relational expression (7-1), below, among the optical flows OP generated in the images at the resolutions σi described above.

$$\sigma i \geq \sigma i\_th \quad (7\text{-}1)$$

In addition, the processing unit 40 selects the optical flow OP of which the tracking count Nt is equal to or greater than a tracking threshold Nt_th, as shown in a relational expression (7-2), below, among the optical flows OP selected as described above.

$$Nt \geq Nt\_th \quad (7\text{-}2)$$

Furthermore, the processing unit 40 calculates the flow length Lf based on the flow U-component ΔU and the flow V-component ΔV of each optical flow OP, as shown in a relational expression (7-3), below.

$$Lf = \sqrt{(\Delta U)^2 + (\Delta V)^2} \quad (7\text{-}3)$$

The processing unit 40 then selects the optical flow OP of which the flow length Lf is equal to or greater than a flow length threshold Lf_th, as shown in a relational expression (7-4), below, among the optical flows OP selected as described above.

$$Lf \geq Lf\_th \quad (7\text{-}4)$$

In addition, the processing unit 40 respectively acquires the own vehicle speed Vc and the steering angle θs from the vehicle speed sensor 15 and the steering angle sensor 16, through the onboard LAN 60 and the communication unit 31. Furthermore, the processing unit 40 calculates a vehicle movement vector ΔL based on the own vehicle speed Vc, the steering angle θs, and the amount of time of the processing cycle τ. The vehicle movement vector ΔL is a movement vector of the vehicle 90 during the processing cycle τ in a three-dimensional-space coordinate system.

The processing unit 40 performs coordinate transformation from the three-dimensional-space coordinate system to a UV coordinate system, based on respective orientations, focal distances, and positions and angles in relation to the road surface of the front camera 11, the rear camera 12, the left-side camera 13, and the right-side camera 14.

In addition, the processing unit 40 calculates the flow length Lf that corresponds to the vehicle movement vector ΔL by converting the vehicle movement vector ΔL in the three-dimensional-space coordinate system to the UV coordinate system of the image. Then, the processing unit 40 subtracts the flow length Lf corresponding to the vehicle movement vector ΔL from the flow length Lf calculated based on the flow U-component ΔU and the flow V-component ΔV, and thereby calculates the ego-cancel flow length Lc.

Then, the processing unit 40 selects the optical flow OP of which the ego-cancel flow length Lc is equal to or greater than a cancel threshold Lc_th, as shown in a relational expression (7-5), below, among the optical flows OP selected as described above.

$$Lc \geq Lc\_th \quad (7\text{-}5)$$

In addition, the processing unit 40 calculates the flow angle θf based on the flow U-component ΔU and the flow V-component ΔV of each optical flow OP, as shown in a relational expression (7-6), below.

$$\theta f = \tan^{-1}\left(\frac{\Delta V}{\Delta U}\right) \quad (7\text{-}6)$$

Furthermore, the processing unit 40 calculates the flow direction difference Δθf based on the calculated flow angle θf, as shown in a relational expression (7-7), below.

$$\theta f = \theta f(n-1) - \theta f(n-2) \quad (7\text{-}7)$$

$$\Delta \theta f \leq \Delta \theta f\_th \quad (7\text{-}8)$$

Then, the processing unit 40 selects the optical flow OP of which the flow direction difference Δθf is equal to or less than a direction difference threshold Δθf_th, as shown in a relational expression (7-8), below, among the optical flows OP selected as described above.

Here, the optical flow OP that is generated in the current processing cycle τ(n) is a movement vector from the feature point in the previous processing cycle τ(n−1). Therefore, in the relational expression (7-7), the flow angle θf calculated in the current processing cycle τ(n) is expressed as θf(n−1).

In a similar manner, the optical flow OP generated in the previous processing cycle τ(n−1) is a movement vector from a feature point in a processing cycle τ(n−2) that is two processing cycle prior to the current. Therefore, in the relational expression (7-7), the flow angle θf calculated in the previous processing cycle τ(n−1) is expressed as θf(n−2).

In addition, the processing unit 40 calculates the corner degree Rf of the feature point of which the optical flow OP is generated, using a Harris corner method. Specifically, as shown in a relational expression (7-9), below, the processing unit 40 calculates the corner degree Rf using a Hessian matrix H.

$$H = \begin{bmatrix} Iu^2 & Iu \times Iv \\ Iu \times Iv & Iv^2 \end{bmatrix} \quad (7\text{-}9)$$

$$Rf = \det(H) - k \times (\text{trace}(H))^2$$

$$\det(H) = \lambda 1 \times \lambda 2$$

$$\text{trace}(H) = \lambda 1 + \lambda 2$$

As shown in the relational expression (7-9), the Hessian matrix H has components that are based on Iu and Iv. Here, as described above, Iu is the gradient in the U-direction of the input luminance Ic (U,V) and is calculated by the filter 33. In addition, as described above, Iv is the gradient in the V-direction of the input luminance Ic (U,V) and is calculated by the filter 33. Furthermore, λ1 and λ2 are each an eigenvalue of the Hessian matrix H. In addition, k is a constant and is, for example, 0.04 to 0.06.

The processing unit 40 then selects the optical flow OP that corresponds to the feature point of which the corner degree Rf is greater than a corner threshold Rf_th, as shown in a relational expression (7-10), below, among the optical flows OP selected as described above.

$$Rf \gtrsim Rf\_th \qquad (7\text{-}10)$$

As described above, the processing unit 40 determines the reliability of the optical flow OP. As a result, as described below, the optical flow OP of which the reliability regarding the object being a moving object is relatively high is selected.

For example, the flow length Lf of a stationary object is relatively short because the flow length Lf is based on the own vehicle speed Vc. In addition, the flow length Lf of a moving object is relatively long because the flow length Lf is based on the own vehicle speed Vc and a movement speed of the moving object. Therefore, the optical flow OP of which the flow length Lf is equal to or greater than the flow length threshold Lf_th is selected.

In addition, the optical flow OP of which the ego-cancel flow length Lc is equal to or greater than the cancel threshold Lc_th is selected. Furthermore, the flow direction difference $\Delta\theta f$ of an object that is moving in one direction is relatively small. Therefore, the optical flow OP of which the flow direction difference $\Delta\theta f$ is equal to or less than the direction difference threshold $\Delta\theta f\_th$ is selected.

As a result of these selections, for example, the optical flow OP of a moving object in the image is selected. In addition, the optical flow OP of a stationary object in the image in the current processing cycle $\tau(n)$ is removed. Therefore, the flow length threshold Lf_th, the cancel threshold Lc_th, and the direction difference threshold $\Delta\theta f\_th$ herein are set based on experiments, simulations, and the like such that selection is performed as described above.

In addition, as described above, the optical flow OP is generated in the image at each resolution σi. The optical flow OP that is generated in an image of which the resolution σi is equal to or greater than the resolution threshold σi_th is selected. In addition, the optical flow OP of which the tracking count Nt is equal to or greater than the tracking threshold Nt_th is selected.

As a result, the accuracy of the optical flow OP increases. Consequently, for example, the accuracy of the flow length Lf, the flow direction difference $\Delta\theta f$, and the ego-cancel flow length Lc increases. Therefore, the resolution threshold σi_th and the tracking threshold Nth herein are set based on experiments, simulations, and the like such that selection is performed as described above.

In addition, among the moving objects, the feet of a person, such as a pedestrian, are in contact with the road surface. Therefore, the optical flow OP of the feet of a person is used for detection of a distance from the vehicle 90 to the pedestrian, and the like.

Therefore, here, in addition to the above-described selection, the optical flow OP that corresponds to a feature point of which the corner degree Rf is greater than the corner threshold Rf_th is selected. As a result, for example, the optical flow OP of the feet of a person is more easily selected. Therefore, the corner threshold Rf_th is set based on experiments, simulations, and the like such that selection is performed as described above.

Next, at step S150, the processing unit 40 performs clustering by sorting the optical flows OP selected at step S140 into groups. Specifically, the processing unit 40 sorts into a single group, the optical flows OP of which the pixel position of the feature point in the image captured in the previous processing cycle $\tau(n-1)$, and the flow length Lf and the flow angle $\theta f$ of the feature point are similar.

Figure 12:
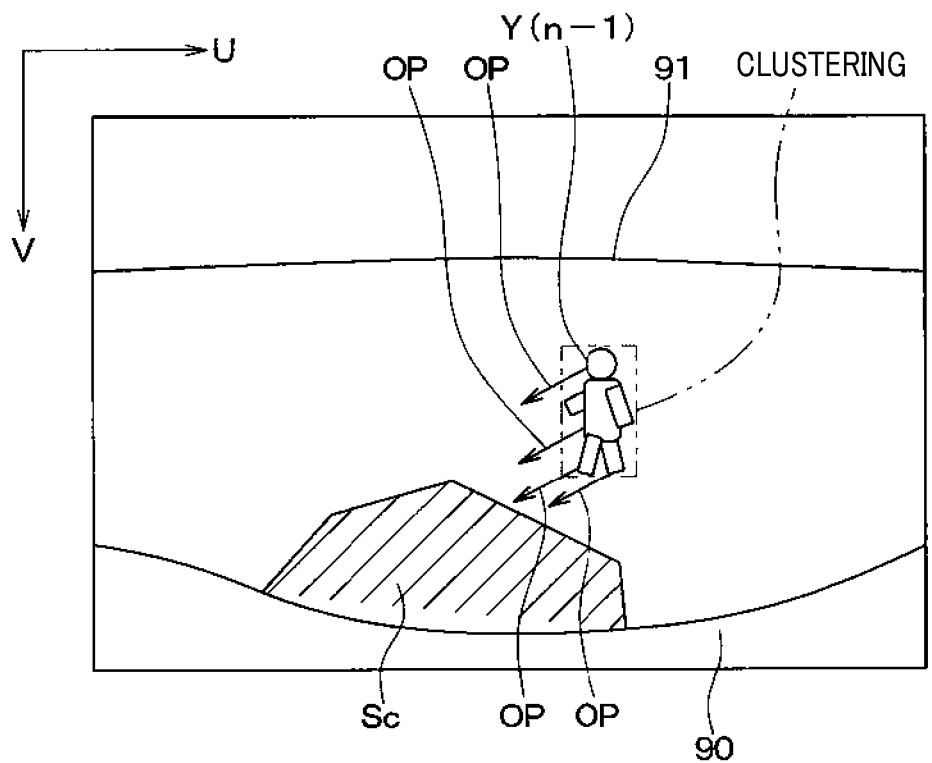
FIG. 12 is a diagram of clustering.

For example, the processing unit 40 extracts the optical flows OP of which the distance between the positions of the feature points in the previous processing cycle $\tau(n-1)$ is within a predetermined distance range, the flow lengths Lf thereof are within a predetermined length range, and the flow angles $\theta f$ thereof are within a predetermined angle range. Then, as shown in FIG. 12, the processing unit 40 sorts these extracted optical flows OP into a single group. Here, in FIG. 12, a single object obtained by clustering is schematically indicated by Y(n−1) and solid lines.

Next, at step S160, the processing unit 40 calculates a physical quantity of each group clustered at step S150, that is, the group of feature points in the previous processing cycle $\tau(n-1)$. Here, the processing unit 40 calculates a position of each group in the three-dimensional-space coordinate system, a length and a width indicating a size of the group, and a movement vector of the group.

Specifically, the processing unit 40 performs coordinate transformation from the UV coordinate system of the image to the three-dimensional-space coordinate system based on the respective orientations, focal distances, and positions and angles in relation to the road surface of the front camera 11, the rear camera 12, the left-side camera 13, and the right-side camera 14. Then, the processing unit 40 converts the feature points and the optical flow OP of each group in the UV coordinate system of the image to the feature points and the optical flow OP of each group in the three-dimensional-space coordinate system.

In addition, the processing unit 40 calculates a representative position Pr of each group, and the length and the width that indicate the size of the group based on the feature points that have been subjected to coordinate transformation. Furthermore, the processing unit 40 calculates a representative movement vector Or of each group based on the optical flow OP that has been subjected to coordinate transformation. Here, for example, the representative position Pr is a center of gravity of the object. In addition, when the object is a person, the representative position Pr may be the feet of the person.

Next, at step S170, the processing unit 40 determines whether each group clustered at step S150 is approaching the shadow boundary Bs.

The processing unit 40 inversely converts the representative position Pr and the representative movement vector Or in the previous processing cycle $\tau(n-1)$ calculated at step S160 from the three-dimensional-space coordinate system to the UV coordinate system of the image. Then, as shown in FIG. 13, the processing unit 40 estimates the pixel position of the group in the current processing cycle $\tau(n)$ based on the representative position Pr and the representative movement vector Or in the previous processing cycle $\tau(n-1)$ in the UV coordinate system.

Figure 13:
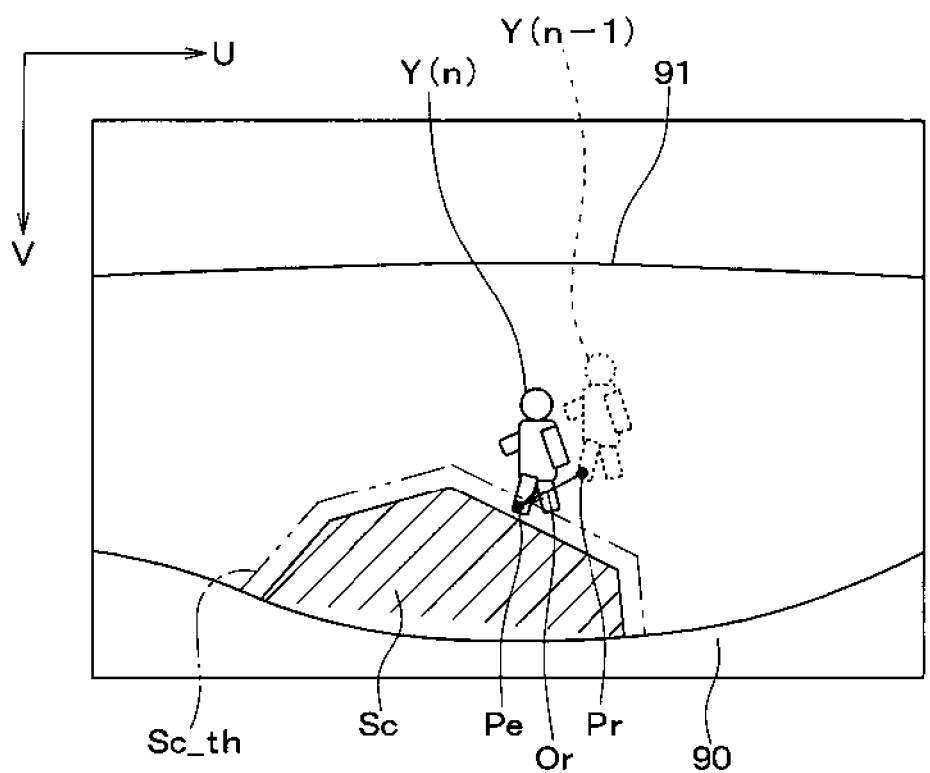
FIG. 13 is a diagram of when an object approaches the own-vehicle shadow.

Here, in FIG. 13, a target group is indicated by broken lines. In addition, the pixel position estimated based on the representative position Pr and the representative movement vector Or is indicated by Pe and a black circle. Furthermore, an object that appears in an image acquired in the previous processing cycle $\tau(n-1)$ is indicated by Y(n−1) and a broken line. In addition, an object that appears in an image acquired in the current processing cycle $\tau(n)$ is indicated by Y(n) and a solid line.

In addition, the processing unit 40 determines whether the representative position Pr in the previous processing cycle $\tau(n-1)$ is positioned outside a threshold area Sc_th and the estimated pixel position is positioned inside the threshold area Sc_th. When determined that the representative position Pr in the previous processing cycle τ(n−1) is positioned outside the threshold area Sc_th and the estimated pixel position is positioned inside the threshold area Sc_th, the processing unit 40 determines that the target group is approaching the shadow boundary Bs. Subsequently, the process proceeds to step S190.

In addition, when determined that the representative position Pr in the previous processing cycle τ(n−1) is not positioned outside the threshold area Sc_th and the estimated pixel position is not positioned inside the threshold area Sc_th, the processing unit 40 determines that the target group is not approaching the shadow boundary Bs. Subsequently, the process proceeds to step S180.

Here, the threshold area Sc_th is set based on the above-described second own vehicle information Xs2 that is the pixel positions of the stable own-vehicle shadow Sc and shadow boundary Bs. Specifically, to enable determination of a state immediately before the object enters the own-vehicle shadow Sc, the threshold area Sc_th is set to an area that is expanded towards the outer side of the own-vehicle shadow Sc from the pixel position of the own-vehicle shadow Sc included in the second own-vehicle-shadow information Xs2, by an amount amounting to a pixel position at a predetermined distance.

At step S180 following step S170, the processing unit 40 stores each group clustered at step S150 as the moving object, in the RAM of the storage unit 34.

Here, when the object is within the area of the own-vehicle shadow Sc, the luminance gradient Mc is relatively low in a portion of the object that overlaps the own-vehicle shadow Sc. As a result, the feature point is not easily extracted in this portion. Therefore, at step S190 following step S170, the processing unit 40 performs an extrapolation process on the group that is approaching the shadow boundary Bs to facilitate extraction of the feature point in the portion of the object that overlaps the own-vehicle shadow Sc in a next processing cycle τ(n+1).

Specifically, in the extrapolation process at step S190, the processing unit 40 extracts each feature point of the group that is approaching the shadow boundary Bs. In addition, as shown in FIG. 14, the processing unit 40 moves the pixel position of the feature point extracted in the current processing cycle τ(n) by an amount amounting to the optical flow OP selected in the current processing cycle τ(n), that is, the optical flow OP from the feature point in the previous processing cycle τ(n−1).

The processing unit 40 then sets the pixel position of the feature point that has been moved as described above as the pixel position of the feature point in the next processing cycle τ(n+1). In addition, the processing unit 40 stores the estimated pixel position in the RAM of the storage unit 34 for use in the next processing cycle τ(n+1).

Figure 14:
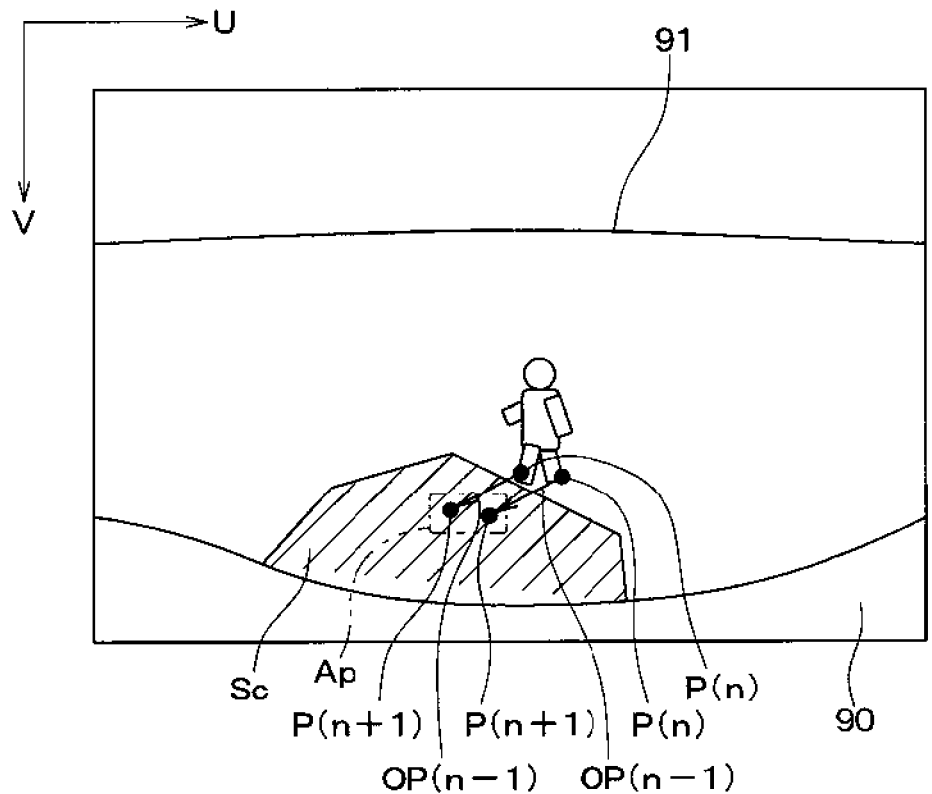
FIG. 14 is a diagram of extrapolation performed by the processing unit.

Here, in FIG. 14, the pixel position of each feature point of the group that is approaching the shadow boundary Bs in the current processing cycle τ(n) is indicated by P(n) and a black circle. In addition, the pixel position of the feature point estimated as described above is indicated by P(n+1) and a black circle. Furthermore, the optical flow OP herein is the optical flow OP from the feature point in the previous processing cycle τ(n−1). Therefore, the optical flow OP is indicated by OP(n−1) in FIG. 14.

Next, at step S200, as shown in FIG. 14, the processing unit 40 estimates a priority area Ap based on the estimated pixel position of the feature point in the next processing cycle τ(n+1) to facilitate differentiation of the portion subjected to the extrapolation process.

Here, the priority area Ap is an area that is predicted to overlap the own-vehicle shadow Sc. As described below, the priority area Ap is an area in which determination values are relaxed in the feature point extraction at step S120 and the reliability determination at step S140. For example, the priority area Ap is the vicinity of the feet of a person when the object is a person. After estimation of the priority area Ap, the process returns to step S110.

An object in the periphery of the vehicle 90 is identified by the processing unit 40 in the obstacle identification system 10, in the manner described above.

Next, a process performed by the processing unit 40 in the next processing cycle τ(n+1) will be described. The above-described priority area Ap will thereby be described. The processes from step S110 to step S115 are performed in a manner similar to that described above.

At step S120 following step S115, the processing unit 40 extracts the feature points in each image. Here, outside of the priority area Ap, the processing unit 40 extracts a pixel of which the luminance gradient Mc is equal to or greater than the feature point threshold Mp_th as the feature point, in a manner similar to that described above. In addition, inside the priority area Ap, the processing unit 40 extracts the feature point that is subjected to the extrapolation process in the processing cycle τ(n).

Next, at step S130, outside the priority area Ap, the processing unit 40 generates the optical flow OP in a manner similar to that described above. In addition, here, as described above, the feature point in the priority area Ap is subjected to the extrapolation process and is therefore extracted. Therefore, as shown in FIG. 15, the optical flow OP that corresponds to the feature point in the priority area Ap is generated.

Figure 15:
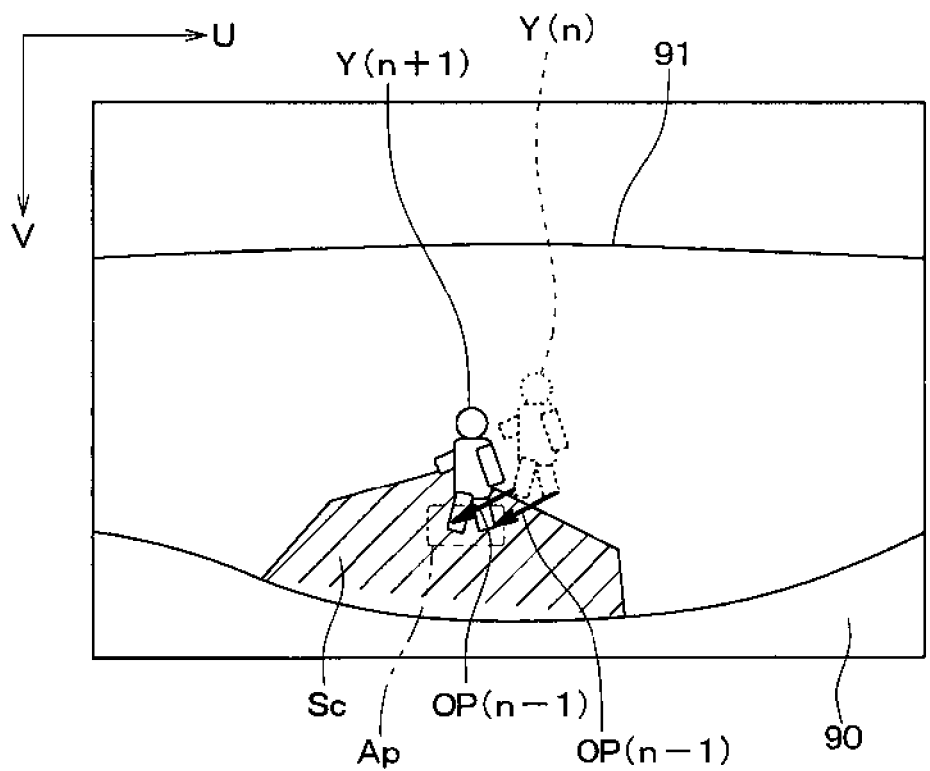
FIG. 15 is a diagram of generation of an optical flow after extrapolation.

Here, in FIG. 15, the object that appears in the image captured in the processing cycle τ(n) is indicated by Y(n) and broken lines. An object that appears in the image captured in the processing cycle τ(n+1) is indicated by Y(n+1) and solid lines. In addition, the optical flow OP of the feature point in the priority area Ap is the optical flow OP of the feature point that is subjected to the extrapolation process.

Therefore, the optical flow OP is identical to the optical flow OP selected in the processing cycle τ(n), that is, the movement vector from the feature point in the previous processing cycle τ(n−1). Thus, the optical flow OP that corresponds to the feature point in the priority area Ap is indicated by OP(n−1).

Next, at step S140, when the priority area Ap is present, the processing unit 40 preferentially selects the optical flow OP that corresponds to the feature point in the priority area Ap. In addition, the processing unit 40 sets the resolution threshold σi_th to be less than that of the optical flow OP outside the priority area Ap.

Furthermore, the processing unit 40 sets the tracking threshold Nt_th to be less than that of the optical flow OP outside the priority area Ap. Still further, the processing unit 40 sets the corner threshold Rf_th to be less than that of the optical flow OP outside the priority area Ap.

In addition, the processing unit 40 sets the cancel threshold Lc_th to be less than that of the optical flow OP outside the priority area Ap. Therefore, as a result of the determination thresholds being relaxed in the priority area Ap, the optical flow OP that corresponds to the feature point in the priority area Ap is easily selected.

In addition, the processing unit 40 selects the optical flow OP that corresponds to the feature point in the priority area Ap of which the resolution σi is equal to or greater than the reduced resolution threshold σi_th.

Furthermore, the processing unit 40 selects the optical flow OP that corresponds to the feature point in the priority area Ap of which the tracking count Nt is equal to or greater than the reduced tracking threshold Nt_th, among the optical flows OP corresponding to the feature points in the priority area Ap selected as described above.

Still further, the processing unit 40 selects the optical flow OP that corresponds to the feature point in the priority area Ap of which the corner degree Rf is equal to or greater than the reduced corner threshold Rf_th, among the optical flows OP corresponding to the feature points in the priority area Ap selected as described above.

In addition, the processing unit 40 selects the optical flow OP that corresponds to the feature point in the priority area Ap of which the ego cancel flow length Lc is equal to or greater than the reduced cancel threshold Lc_th, among the optical flows OP corresponding to the feature points in the priority area Ap selected as described above.

Furthermore, the processing unit 40 selects the optical flow OP that corresponds to the feature point in the priority area Ap of which the flow length Lf is equal to or greater than the flow length threshold Lf_th, among the optical flows OP corresponding to the feature points in the priority area Ap selected as described above. Moreover, the processing unit 40 selects the optical flow OP that corresponds to the feature point in the priority area Ap of which the flow direction difference $\Delta\theta f$ is equal to or less than the direction difference threshold $\Delta\theta f\_th$, among the optical flows OP corresponding to the feature points in the priority area Ap selected as described above. The optical flow OP that corresponds to the feature point in the priority area Ap is selected in this manner.

In addition, the processing unit 40 selects the optical flow OP outside the priority area Ap after selecting the optical flow OP that corresponds to the feature point in the priority area Ap. Here, the processing unit 40 selects the optical flow OP outside the priority area Ap without changing the determination thresholds.

Next, the processes from step S150 to step S200 are performed in a manner similar to that described above.

As described above, in the priority area Ap, the determination thresholds are relaxed in the feature point extraction at step S120 and the reliability determination at step S140. As a result, the optical flow OP that corresponds to the feature point in the priority area Ap is easily selected. Consequently, the optical flow OP of an object immediately after the object enters the own-vehicle shadow Sc is easily outputted. For example, when the object is a person, the optical flow OP of the feet is easily outputted immediately after the person enters the own-vehicle shadow Sc. Consequently, here, the object can be tracked even when the object enters the own-vehicle shadow Sc.

Next, facilitation of the estimation of the own-vehicle shadow Sc by the obstacle identification apparatus 30 will be described.

The processing unit 40 of the obstacle identification apparatus 30 estimates the shadow boundary Bs based on Iu and Iv at above-described step S320. Specifically, the processing unit 40 estimates the shadow boundary Bs based on the luminance gradient Mc. Then, at above-described step S330, the processing unit 40 estimates the own-vehicle shadow Sc based on the estimated shadow boundary Bs. Because the own-vehicle shadow Sc is estimated based only on luminance information and gradient information, estimation of the own-vehicle shadow Sc is facilitated.

Here, as described above, Iu is the gradient in the U-direction of the input luminance Ic(U,V) and is calculated by the filter 33. In addition, Iv is the gradient in the V-direction of the input luminance Ic(U,V) and is calculated by the filter 33. The luminance gradient Mc is the positive square root of the sum of Iu squared and Iv squared.

In addition, in the obstacle identification apparatus 30, effects such as those described in [1] to [7], below, are also achieved.

[1] The processing unit 40 estimates the candidates for the own-vehicle shadow Sc based on the variance of the luminance values in the image in an area further towards an upper side than the own vehicle 90 appearing in the image is and further towards a lower side than the horizon 91 appearing in the image is. As a result, the estimation accuracy regarding the candidates for the own-vehicle shadow Sc is improved.

[2] The processing unit 40 corrects the estimated shadow boundary Bs based on the luminance values on the upper side of the image from the estimated shadow boundary Bs and the luminance values on the lower side of the image from the estimated shadow boundary Bs. For example, the processing unit 40 corrects the shadow boundary Bs based on a luminance value that is on the upper side of the image and on a normal line that passes through a pixel of the estimated shadow boundary Bs and a luminance value that is on the lower side of the image and on the normal line that passes through the pixel of the shadow boundary Bs. As a result, the estimation accuracy regarding the shadow boundary Bs is improved.

[3] The processing unit 40 stores the second own-vehicle-shadow information Xs2 in the storage unit 34. As described above, the second own-vehicle-shadow information Xs2 is the pixel position of the shadow boundary Bs that is updated based on the changes between the shadow boundary Bs estimated from the image acquired in the current processing cycle τ(n) and the shadow boundary Bs estimated from the image acquired in a processing cycle τ that is prior to the current point.

As a result, the pixel position of the own-vehicle shadow Sc of which the changes in the shadow boundary Bs are relatively small, that is, a stable own-vehicle shadow Sc is stored. Consequently, the object and the own-vehicle shadow Sc can be differentiated even when the object and the own-vehicle shadow Sc overlap. In addition, as a result, determination accuracy regarding whether the object is approaching the shadow boundary Bs is improved.

[4] When determined that the object is approaching the shadow boundary Bs, the processing unit 40 performs the extrapolation process. In the extrapolation process, the processing unit 40 extracts each feature point of a group that is approaching the shadow boundary Bs. In addition, as shown in FIG. 14, the processing unit 40 moves the pixel position of the feature point extracted in the current processing cycle τ(n) by an amount amounting to the optical flow OP selected in the current processing cycle τ(n), that is, the optical flow OP from the feature point in the previous processing cycle τ(n−1).

Then, the processing unit 40 sets the pixel position of the feature point that has been moved as the pixel position of the feature point in the next processing cycle τ(n+1). Consequently, the feature point of a portion of the object overlapping the own-vehicle shadow Sc in the next processing cycle τ(n+1) can be easily extracted.

[5] The processing unit 40 selects the optical flow OP generated at step S130 based on the resolution σi, the tracking count Nt, the flow length Lf, the ego-cancel flow length Lc, the flow direction difference Δθf, and the corner degree Rf. As a result, the optical flow OP of which reliability regarding the object being a moving object is relatively high is selected.

[6] The processing unit 40 selects the optical flow OP of the feature point that is subjected to the extrapolation process by changing the resolution threshold σi_th, the tracking threshold Nt_th, the cancel threshold Lc_th, and the corner threshold Rf_th. As a result, the optical flow OP of the moving object is easily outputted even in a state in which the optical flow OP is not easily outputted, such as immediately after the object enters the own-vehicle shadow Sc. Consequently, the object can be tracked even when the object enters the own-vehicle shadow Sc.

[7] The processing unit 40 extracts the feature points based on the luminance gradient Mc. As a result, extraction of the feature points is facilitated. In addition, a relatively large number of required feature points are extracted.

OTHER EMBODIMENTS

The present disclosure is not limited to the above-described embodiment and modifications can be made thereto as appropriate. In addition, an element that configures an embodiment according to the above-described embodiments is not necessarily a requisite unless particularly specified as being a requisite, clearly considered a requisite in principle, or the like.

The processing unit and the like, and the method thereof described in the present disclosure may be actualized by a dedicated computer that is provided such as to be configured by a processor and a memory, the processor being programmed to provide one or a plurality of functions that are realized by a computer program. Alternatively, the processing unit and the like, and the method thereof described in the present disclosure may be actualized by a dedicated computer that is provided by a processor being configured by a single dedicated hardware logic circuit or more.

As another alternative, the processing unit and the like, and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

(1) According to the above-described embodiments, the processing unit 40 estimates the degree of similarity between the feature points in the previous processing cycle τ(n−1) and the feature points in the current processing cycle τ(n) by calculating the SAD. In this regard, the processing unit 40 may estimate the degree of similarity between the feature points in the previous processing cycle τ(n−1) and the feature points in the current processing cycle τ(n) by calculating a sum of squared difference (SSD) in the pixel block.

In addition, the processing unit 40 may estimate the degree of similarity between the feature points in the previous processing cycle τ(n−1) and the feature points in the current processing cycle τ(n) by calculating a normalized cross correlation (NCC) in the pixel block.

(2) According to the above-described embodiments, the filter 33 calculates the gradient in the U-direction of the image and the gradient in the V-direction of the image using the Sobel filter. In this regard, the filter 33 is not limited to use of the Sobel filter. The filter 33 may calculate the gradient in the U-direction of the image and the gradient in the V-direction of the image using a differential filter, a Prewitt filter, a Roberts filter, or the like.

What is claimed is:

1. An obstacle identification apparatus comprising:
   an acquiring unit that acquires an image that is captured by a camera that is mounted to a vehicle;
   a filter that calculates a first gradient that is a gradient in a first direction of a luminance value of pixels in the image and a second gradient that is a gradient of the luminance value in a second direction orthogonal to the first direction of the first gradient;
   a boundary estimating unit that estimates a shadow boundary based on the first gradient and the second gradient, the shadow boundary being a boundary between an own-vehicle shadow that is a shadow of the vehicle and an object outside the vehicle; and
   an own-vehicle-shadow estimating unit that estimates the own-vehicle shadow based on the shadow boundary estimated by the boundary estimating unit, wherein
   the boundary estimating unit estimates the shadow boundary among candidates for the own-vehicle shadow, based on a square root of a sum of the first gradient squared and the second gradient squared.

2. The obstacle identification apparatus according to claim 1, wherein:
   the filter calculates the first gradient and the second gradient using a Sobel filter.

3. The obstacle identification apparatus according to claim 2, further comprising:
   a candidate estimating unit that estimates a candidate for the own-vehicle shadow in the image, based on luminance values in the image in an area further towards an upper side than the vehicle appearing in the image is and further towards a lower side than a horizon appearing in the image is, wherein
   the boundary estimating unit estimates the shadow boundary among the candidates for the own-vehicle shadow estimated by the candidate estimating unit.

4. The obstacle identification apparatus according to claim 3, wherein:
   the boundary estimating unit corrects the shadow boundary based on a luminance value on an upper side of the image from the shadow boundary and a luminance value on a lower side of the image from the shadow boundary.

5. The obstacle identification apparatus according to claim 4, further comprising:
   a correcting unit that, based on a pixel position of the shadow boundary, corrects a pixel position of a shadow boundary adjacent thereto.

6. The obstacle identification apparatus according to claim 5, further comprising:
   an extracting unit that extracts a feature point in the image;
   a generating unit that generates an optical flow that is a movement vector from a previous feature point in an image acquired by the acquiring unit before a current point to a current feature point in an image acquired by the acquiring unit at the current point;
   a storage unit that stores therein a pixel position of either of a current shadow boundary that is estimated from the image acquired by the acquiring unit at the current point and a previous shadow boundary that is estimated from the image acquired by the acquiring unit before the current point, based on changes between the current shadow boundary that is estimated from the image acquired by the acquiring unit at the current point and the previous shadow boundary that is estimated from the image acquired by the acquiring unit before the current point; and a determining unit that determines whether the object is approaching the current shadow boundary based on the current feature point, the previous feature point, the optical flow, and the pixel position of either of the current shadow boundary and the previous shadow boundary stored in the storage unit.

7. The obstacle identification apparatus according to claim 6, further comprising:

an extrapolating unit that estimates, when the determining unit determines that the object is approaching the current shadow boundary, a next feature point of the object that is determined to be approaching the shadow boundary in an image that is subsequently acquired by the acquiring unit, based on the current feature point, the previous feature point, and the optical flow of the object that is determined to be approaching the current shadow boundary in the image acquired by the acquiring unit at the current point.

8. The obstacle identification apparatus according to claim 7, further comprising:

a selecting unit that selects the optical flow based on a resolution of the image, a tracking count that is a count that is increased each time optical flows that correspond to each other are generated, a corner degree of each of the current feature point and the previous feature point based on the first gradient and the second gradient, and an ego-cancel flow length that is a length obtained by a length of the optical flow corresponding to a movement distance of the vehicle being subtracted from a length of the optical flow generated by the generating unit.

9. The obstacle identification apparatus according to claim 8, wherein:

the selecting unit selects the optical flow of the next feature point estimated by the extrapolating unit by changing a threshold of the resolution, a threshold of the tracking count, a threshold of the ego-cancel flow length, and a threshold of the corner degree.

10. The obstacle identification apparatus according to claim 9, wherein:

the extracting unit extracts a feature point based on a square root of a sum of the first gradient squared and the second gradient squared.

11. The obstacle identification apparatus according to claim 7, wherein:

the extracting unit extracts the feature point based on a square root of a sum of the first gradient squared and the second gradient squared.

12. The obstacle identification apparatus according to claim 1, further comprising:

a correcting unit that, based on a pixel position of the shadow boundary, corrects a pixel position of a shadow boundary adjacent thereto.

13. An obstacle identification apparatus comprising:

an acquiring unit that acquires an image that is captured by a camera that is mounted to a vehicle;

a filter that calculates a first gradient that is a gradient in a first direction of a luminance value of pixels in the image and a second gradient that is a gradient of the luminance value in a second direction orthogonal to the first direction of the first gradient;

a boundary estimating unit that estimates a shadow boundary based on the first gradient and the second gradient, the shadow boundary being a boundary between an own-vehicle shadow that is a shadow of the vehicle and an object outside the vehicle;

an own-vehicle-shadow estimating unit that estimates the own-vehicle shadow based on the shadow boundary estimated by the boundary estimating unit; and a candidate estimating unit that estimates a candidate for the own-vehicle shadow in the image, based on luminance values in the image in an area further towards an upper side than the vehicle appearing in the image is and further towards a lower side than a horizon appearing in the image is, wherein the boundary estimating unit estimates the shadow boundary among the candidates for the own-vehicle shadow estimated by the candidate estimating unit.

14. An obstacle identification apparatus comprising:

an acquiring unit that acquires an image that is captured by a camera that is mounted to a vehicle;

a filter that calculates a first gradient that is a gradient in a first direction of a luminance value of pixels in the image and a second gradient that is a gradient of the luminance value in a second direction orthogonal to the first direction of the first gradient;

a boundary estimating unit that estimates a shadow boundary based on the first gradient and the second gradient, the shadow boundary being a boundary between an own-vehicle shadow that is a shadow of the vehicle and an object outside the vehicle; and an own-vehicle-shadow estimating unit that estimates the own-vehicle shadow based on the shadow boundary estimated by the boundary estimating unit, wherein the boundary estimating unit corrects the shadow boundary based on a luminance value on an upper side of the image from the shadow boundary and a luminance value on a lower side of the image from the shadow boundary.

15. An obstacle identification apparatus comprising:

an acquiring unit that acquires an image that is captured by a camera that is mounted to a vehicle;

a filter that calculates a first gradient that is a gradient in a first direction of a luminance value of pixels in the image and a second gradient that is a gradient of the luminance value in a second direction orthogonal to the first direction of the first gradient;

a boundary estimating unit that estimates a shadow boundary based on the first gradient and the second gradient, the shadow boundary being a boundary between an own-vehicle shadow that is a shadow of the vehicle and an object outside the vehicle;

an own-vehicle-shadow estimating unit that estimates the own-vehicle shadow based on the shadow boundary estimated by the boundary estimating unit;

an extracting unit that extracts a feature point in the image;

a generating unit that generates an optical flow that is a movement vector from a previous feature point in an image acquired by the acquiring unit before a current point to a current feature point in an image acquired by the acquiring unit at the current point;

a storage unit that stores therein a pixel position of either of a current shadow boundary that is estimated from the image acquired by the acquiring unit at the current point and a previous shadow boundary that is estimated from the image acquired by the acquiring unit before the current point, based on changes between the current shadow boundary that is estimated from the image acquired by the acquiring unit at the current point and the previous shadow boundary that is estimated from the image acquired by the acquiring unit before the current point; and a determining unit that determines whether the object is approaching the current shadow boundary based on the current feature point, the previous feature point, the optical flow, and the pixel position of either of the current shadow boundary and the previous shadow boundary stored in the storage unit.

16. A non-transitory computer-readable storage medium on which an obstacle identification program is stored, the obstacle identification program comprising a set of computer-readable instructions that, when read and executed by a processor provided in an obstacle identification apparatus, cause the processor to implement:

acquiring an image that is captured by a camera that is mounted to a vehicle;

calculating a first gradient that is a gradient in a first direction of a luminance value of pixels in the image and a second gradient that is a gradient of the luminance value in a second direction orthogonal to the first direction of the first gradient;

estimating a shadow boundary based on the first gradient and the second gradient, the shadow boundary being a boundary between an own-vehicle shadow that is a shadow of the vehicle and an object outside the vehicle;

estimating the own-vehicle shadow based on the estimated shadow boundary; and estimating the shadow boundary among candidates for the own-vehicle shadow, based on a square root of a sum of the first gradient squared and the second gradient squared.

17. An obstacle identification method comprising:

acquiring, by an obstacle identification apparatus that is mounted to a vehicle, an image that is captured by a camera that is mounted to the vehicle;

calculating, by the obstacle identification apparatus, a first gradient that is a gradient in a first direction of a luminance value of pixels in the image and a second gradient that is a gradient of the luminance value in a second direction orthogonal to the first direction of the first gradient;

estimating, by the obstacle identification apparatus, a shadow boundary based on the first gradient and the second gradient, the shadow boundary being a boundary between an own-vehicle shadow that is a shadow of the vehicle and an object outside the vehicle;

estimating, by the obstacle identification apparatus, the own-vehicle shadow based on the estimated shadow boundary; and estimating, by the obstacle identification apparatus, the shadow boundary among candidates for the own-vehicle shadow, based on a square root of a sum of the first gradient squared and the second gradient squared.

* * * * *